(12) United States Patent
Jeong et al.

(10) Patent No.: US 10,499,268 B2
(45) Date of Patent: Dec. 3, 2019

(54) RADIO LINK FAILURE DETECTION METHOD AND APPARATUS FOR WIRELESS COMMUNICATION SYSTEM

(71) Applicant: Samsung Electronics Co., Ltd., Suwon-si, Gyeonggi-do (KR)

(72) Inventors: Kyeong In Jeong, Hwaseong-si (KR); Gert-Jan Van Lieshout, Apeldoorn (NL); Chengjun Sun, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/225,712

(22) Filed: Dec. 19, 2018

(65) Prior Publication Data
US 2019/0124531 A1  Apr. 25, 2019

Related U.S. Application Data

(63) Continuation of application No. 15/489,516, filed on Apr. 17, 2017, now Pat. No. 10,200,898, which is a (Continued)

(30) Foreign Application Priority Data

Nov. 5, 2008 (KR) .......................... 10-2008-0109576

(51) Int. Cl.
*H04B 17/26* (2015.01)
*H04W 24/08* (2009.01)
(Continued)

(52) U.S. Cl.
CPC ............ *H04W 24/08* (2013.01); *H04B 17/24* (2015.01); *H04B 17/26* (2015.01); *H04B 17/309* (2015.01);
(Continued)

(58) Field of Classification Search
CPC combination set(s) only.
See application file for complete search history.

(56) References Cited

U.S. PATENT DOCUMENTS

2004/0203441 A1  10/2004  Smith
2007/0129017 A1   6/2007  Dalsgaard et al.
(Continued)

FOREIGN PATENT DOCUMENTS

| EP | 0412769 A2 | 2/1991 |
| WO | 2007130324 A2 | 11/2007 |
| WO | 2010053793 A2 | 5/2010 |

OTHER PUBLICATIONS

ISA/KR, International Search Report, International Application No. PCT/KR2009/006443, dated Jun. 7, 2010.
(Continued)

*Primary Examiner* — Yuwen Pan
*Assistant Examiner* — Erica L Fleming-Hall

(57) ABSTRACT

A radio link failure detection method of a user equipment transitioning between a Discontinuous Reception (DRX) mode and non-DRX mode cyclically in a wireless communication system includes transitioning between a Discontinuous Reception (DRX) mode and a non-DRX mode in a wireless communication system. The method also includes adjusting, when a mode transition occurs, a size of a monitoring window for a transitioned operation mode; reporting a radio channel condition acquired by monitoring and averaging the channel condition within the monitoring window; and repeating adjustment of the monitoring window size and report of the radio channel condition while moving the monitoring window as time progress.

18 Claims, 9 Drawing Sheets

Related U.S. Application Data continuation of application No. 12/590,312, filed on Nov. 5, 2009, now Pat. No. 9,629,029.

(51) Int. Cl.
| | | |
|---|---|---|
| *H04B 17/309* | (2015.01) | |
| *H04B 17/24* | (2015.01) | |
| *H04W 76/18* | (2018.01) | |
| *H04W 28/18* | (2009.01) | |
| *H04W 76/28* | (2018.01) | |
| *H04W 24/04* | (2009.01) | |

(52) U.S. Cl.
CPC ........... *H04W 24/04* (2013.01); *H04W 28/18* (2013.01); *H04W 76/18* (2018.02); *H04W 76/28* (2018.02)

(56) References Cited

U.S. PATENT DOCUMENTS

| | | | | |
|---|---|---|---|---|
| 2008/0090573 A1* | 4/2008 | Kim | H04W 36/08 | 455/436 |
| 2008/0130488 A1* | 6/2008 | Kuo | H04L 1/1812 | 370/216 |
| 2008/0186892 A1* | 8/2008 | Damnjanovic | H04W 52/0216 | 370/311 |
| 2008/0188266 A1* | 8/2008 | Carter | H04W 16/10 | 455/561 |
| 2008/0225744 A1* | 9/2008 | DiGirolamo | H04W 28/18 | 370/252 |
| 2009/0103511 A1* | 4/2009 | Marinier | H04L 47/36 | 370/345 |
| 2009/0175186 A1* | 7/2009 | Du | H04W 76/28 | 370/252 |
| 2009/0180414 A1* | 7/2009 | Maeda | H04B 7/2643 | 370/311 |
| 2009/0264164 A1* | 10/2009 | Chun | H04W 52/0216 | 455/574 |
| 2010/0112958 A1* | 5/2010 | Krishnamurthy | H04B 17/24 | 455/67.11 |
| 2010/0113008 A1* | 5/2010 | Wang | H04L 1/20 | 455/423 |
| 2010/0118856 A1* | 5/2010 | Krishnamurthy | H04L 1/0026 | 370/342 |
| 2010/0120429 A1* | 5/2010 | Kazmi | H04W 36/30 | 455/436 |
| 2010/0142485 A1* | 6/2010 | Lee | H04W 36/02 | 370/331 |
| 2010/0189022 A1* | 7/2010 | Pelletier | H04W 52/0225 | 370/311 |
| 2010/0323683 A1* | 12/2010 | Kazmi | H04W 64/00 | 455/422.1 |
| 2011/0038348 A1* | 2/2011 | Borsella | G10H 1/361 | 370/331 |
| 2011/0183663 A1* | 7/2011 | Kenehan | H04W 76/048 | 455/423 |
| 2013/0195023 A1* | 8/2013 | Vaisanen | H04L 1/20 | 370/329 |
| 2017/0223562 A1* | 8/2017 | Jeong | H04W 76/18 | |

OTHER PUBLICATIONS

European Patent Office, European Search Report dated Aug. 8, 2014 in connection with European Application No. 09824968.3, 8 pages.

Huawei, "Radio problem detection," R2-086636, 3GPP TSG RAN WG2 #64, Prague, Czech Republic, Nov. 10-14, 2008, 5 pages.

Nortel Networks, "Radio link Problem Detection by the UE," R4-081726, TSG-RAN Working Group 4 (Radio) meeting #48, Aug. 18-22, 2008, Jeju, Korea, 5 pages.

Motorola, "Further details on out-of-sync and in-sync detection," R4-082560, 3GPP TSG-RAN WG4 Meeting #48bis, Edinburgh, UK, Sep. 29-Oct. 3, 2008, 3 pages.

European Patent Office, "Communication pursuant to Article 94(3) EPC," European Patent Application No. 09824968.3, dated Dec. 22, 2017, 8 pages.

* cited by examiner

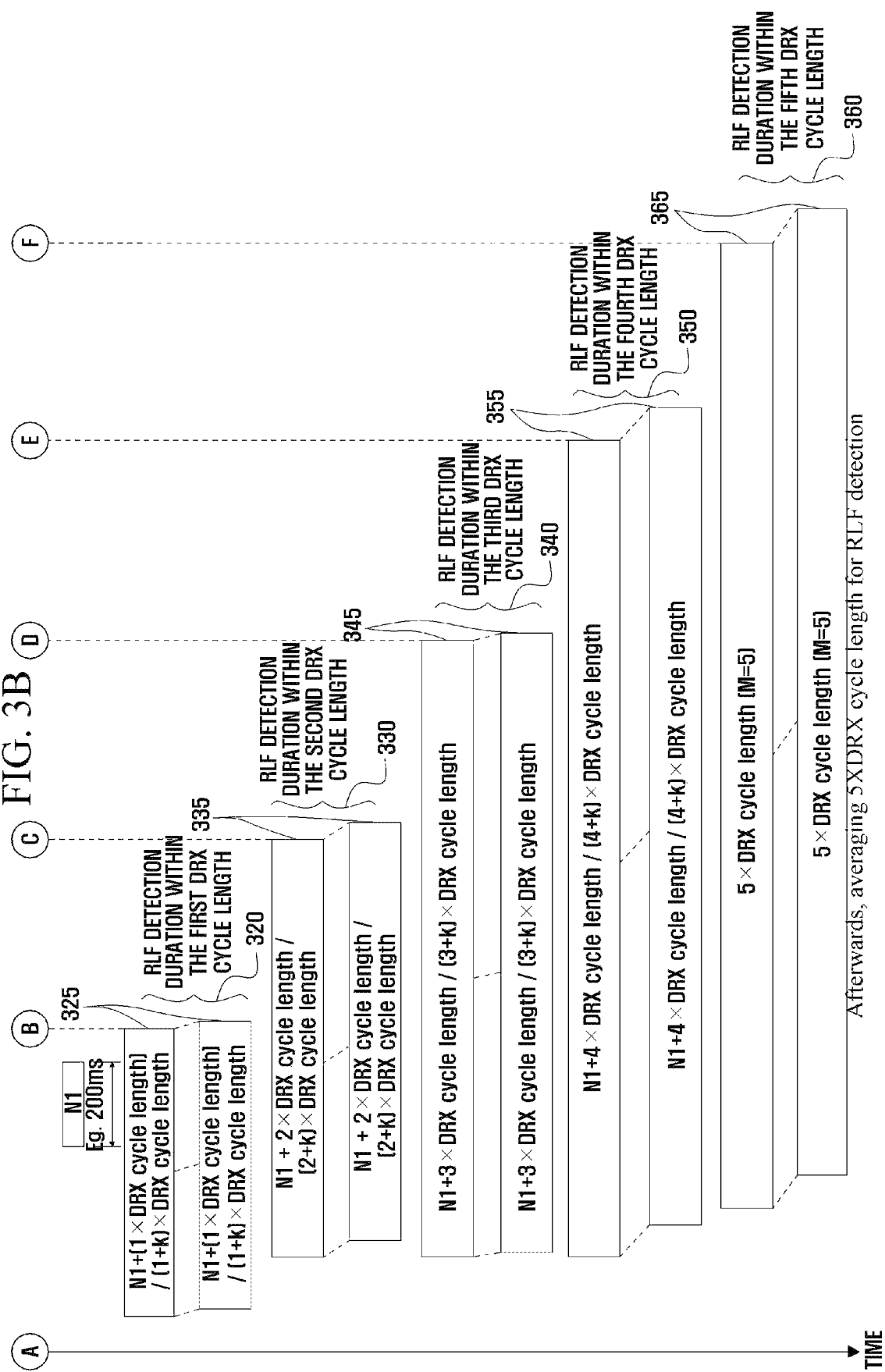

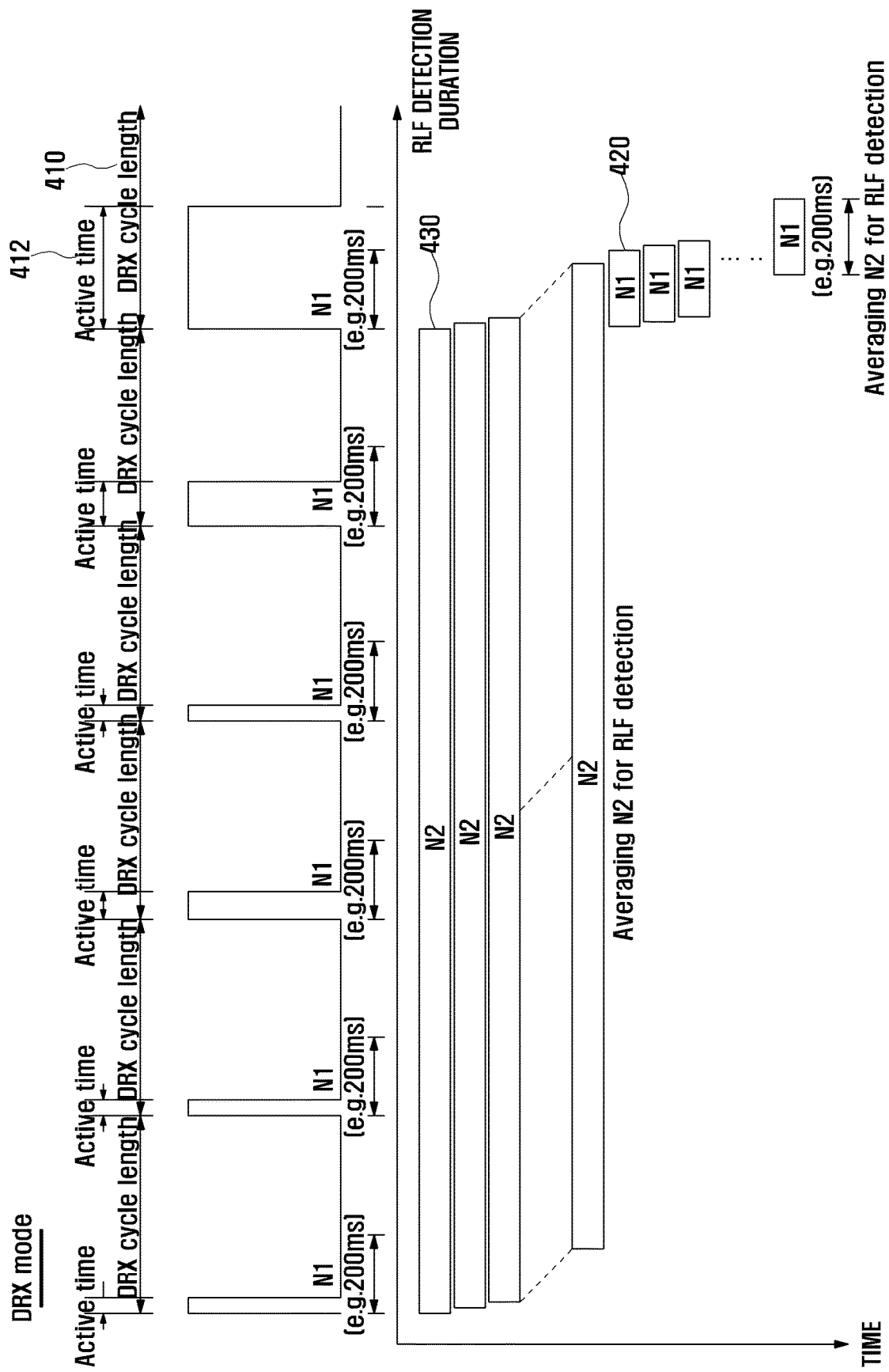

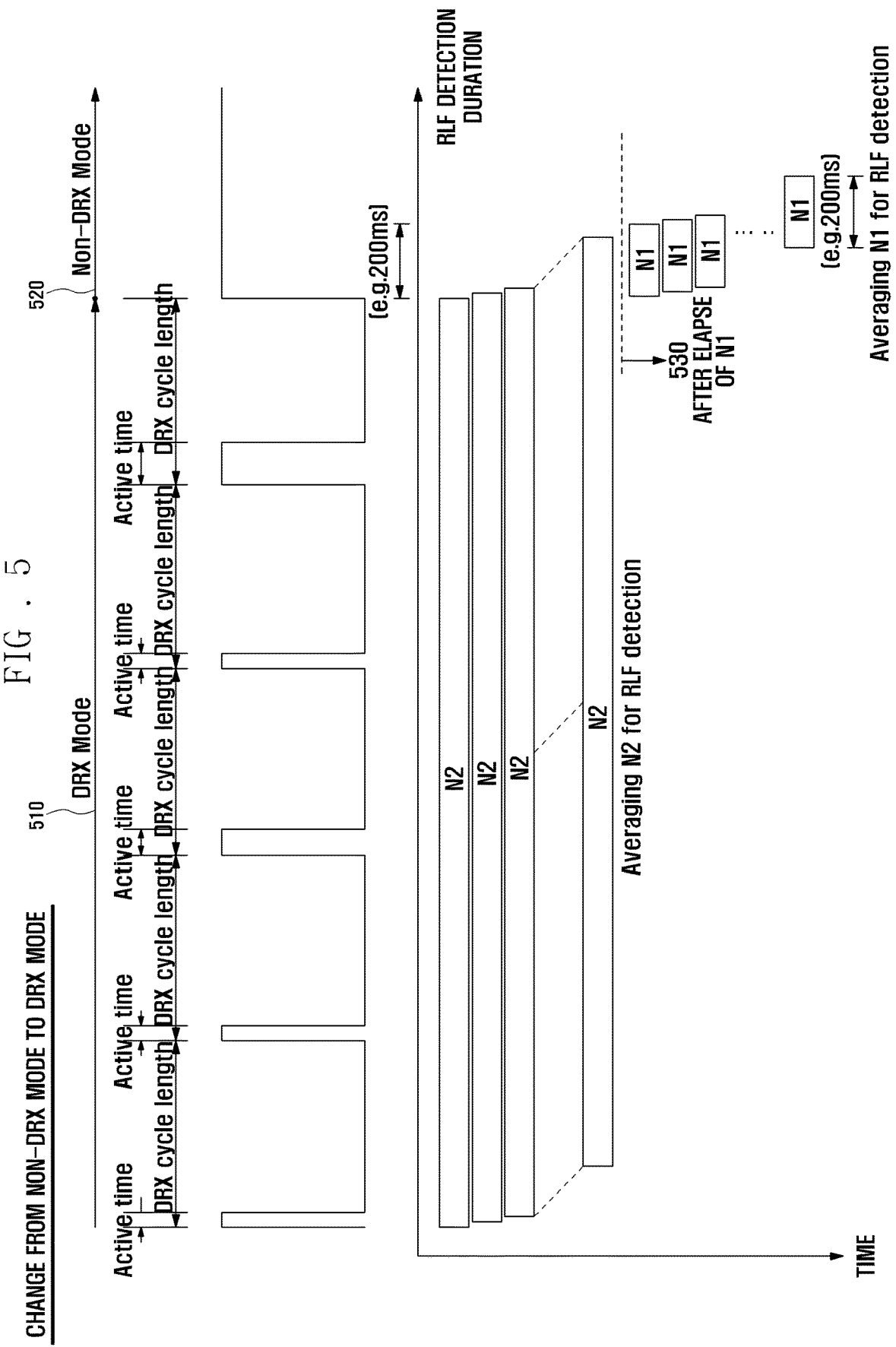

RADIO LINK FAILURE DETECTION METHOD AND APPARATUS FOR WIRELESS COMMUNICATION SYSTEM

CROSS-REFERENCE TO RELATED APPLICATIONS

This application is a continuation of application Ser. No. 15/489,516, filed Apr. 17, 2017, which is a continuation of application Ser. No. 12/590,312, filed on Nov. 5, 2009, now U.S. Pat. No. 9,629,029, which claims priority to Korean Application No. 10-2008-0109576, filed Nov. 5, 2008, the contents of which are incorporated herein by reference in their entireties.

BACKGROUND

1. Field

The present invention relates to wireless communications and, in particular, to a radio link failure detection method of a user equipment transitioning between a Discontinuous Reception (DRX) mode and non-DRX mode cyclically in a wireless communication system.

2. Description of Related Art

Long Term Evolution (LTE), as the next evolutionary technology of the 3rd generation mobile communication system known as Universal Mobile Telecommunication Service (UMTS), is designed to provide improved high speed packet data services based on the Orthogonal Frequency Division Multiplexing (OFDM).

FIG. 1 illustrates a diagram for an LTE system to which the radio link failure detection method of the present invention is adopted.

As shown in FIG. 1, an LTE system is characterized with the Evolved Radio Access Network (hereinafter called E-RAN) 110 and 112 including two infrastructure nodes: the Evolved Node B (hereinafter called ENB or Node B) 120, 122, 124, 126, and 128 and the anchor node 130 and 132. A User Equipment (UE) 101 connects to the Internet Protocol (IP) network via an eNB and an anchor node. The eNB is connected to the eNB through a radio channel and responsible for cell and radio resource management. For instance, the eNB broadcasts the control information in the form of system information within the cell, allocates radio resources to the UEs for transmission and reception of data and control information, and determines handover of the UEs based on the channel management information of the serving and neighbor cells. The eNB includes control protocols such as Radio Resource Control (RRC) protocol related to the radio resource management.

FIG. 2 illustrates a timing diagram for a Discontinuous Reception (DRX) mode operation of a UE in the LTE system of FIG. 1. The UE starts reception of Physical Downlink Control Channel (PDCCH) carrying the uplink/downlink scheduling information at the beginning of every DRX cycle and then communicates the data/control information through Downlink Shared Channel (DSCH) and Uplink Shared Channel (USCH) based on the scheduling information until a UE's DRX timer expires. The timer restarts whenever the scheduling information destined to the UE is transmitted on the PDCCH. A DRX cycle length is divided into an active time during which the UE receives the uplink/downlink scheduling information on the PDCCH and communicating the data/control information through the DSCH and USCH until the time expires and an inactive time during which the UE switches off the uplink/downlink channels to save energy.

The durations of the active time and inactive time vary depending on the operation of the DRX timer (in FIG. 2, the active time of the first DRX cycle is shorter than that of the second DRX cycle).

Meanwhile, the radio link between the UE and eNB can fail due to various causes, which is referred to as a Radio Link Failure (RFL). Additionally an RLF detection mechanism is required to be defined in the LTE system. Typically, the RLF detection is performed such that the UE monitors the radio channel status to detect disconnection to the base station. However, no clear RLF detection mechanism for the UE operating in DRX mode as shown in FIG. 2 is specified in $3^{rd}$ Generation Partnership Project (3GPP) standards. There is therefore a need of an RLF detection method for the UE operating in DRX mode.

SUMMARY

To address the above-discussed deficiencies of the prior art, it is a primary object to provide a RLF detection method for a UE transitioning between a DRX mode and a non-DRX mode in a wireless communication system that is capable of efficiently detecting the RLF and recovering from the RLF.

In accordance with an exemplary embodiment of the present invention, a radio link failure detection method for a user equipment transitioning between a Discontinuous Reception (DRX) mode and a non-DRX mode in a wireless communication system includes adjusting, when a mode transition occurs, a size of a monitoring window for a transitioned operation mode; reporting a radio channel condition acquired by monitoring and averaging the channel condition within the monitoring window; and repeating adjustment of the monitoring window size and report of the radio channel condition while moving the monitoring window as time progress.

In accordance with another exemplary embodiment of the present invention, a radio link failure detection apparatus transitioning between a Discontinuous Reception (DRX) mode and a non-DRX mode in a wireless communication system includes a channel measurer that measures the radio channel to detect a radio link failure in a preset monitoring window; a transceiver that reports whether the radio link failure is detected; and a controller that changes, when a mode transition occurs, a size of the monitoring window for the transitioned operation mode and detects the radio link failure while moving the monitoring window as time progress.

In accordance with still another exemplary embodiment of the present invention, a radio link failure detection method for a user equipment transitioning between a Discontinuous Reception (DRX) mode and a non-DRX mode and including a first fixed monitoring window, a second fixed monitoring window, and a variable monitoring window, in a wireless communication system includes reporting, when a mode transition occurs from the non-DRX mode to the DRX mode, a radio channel condition after averaging the channel conditions measured during the variable monitoring window; reporting the radio channel condition after averaging the channel conditions measured during the second fixed monitoring window when a predetermined time elapsed after the transition to the non-DRX mode; and reporting, when a time corresponding to the first fixe monitoring after the transition from the DRX mode to the non-DRX mode, the radio channel condition after averaging the channel conditions measured during the first fixed monitoring window, the variable monitoring window has a size between sizes of the first and second fixed monitoring windows.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A-3B illustrate a timing diagram for an RLF detection method after the transition from the non-DRX mode to the DRX mode (in the first period) according to an exemplary embodiment of the present invention;

FIG. 4 illustrates a timing diagram for an RLF detection method in a DRX cycle length (in the active time of the second period) according to an exemplary embodiment of the present invention:

FIG. 5 illustrates a timing diagram for an RLF detection method after the transition from the DRX mode to the non-DRX mode (the third period) according to an exemplary embodiment of the present invention;

FIG. 6 is depicted wherein the UE transitions from the non-DRX mode to the DRX mode;

DETAILED DESCRIPTION

Figure 1:
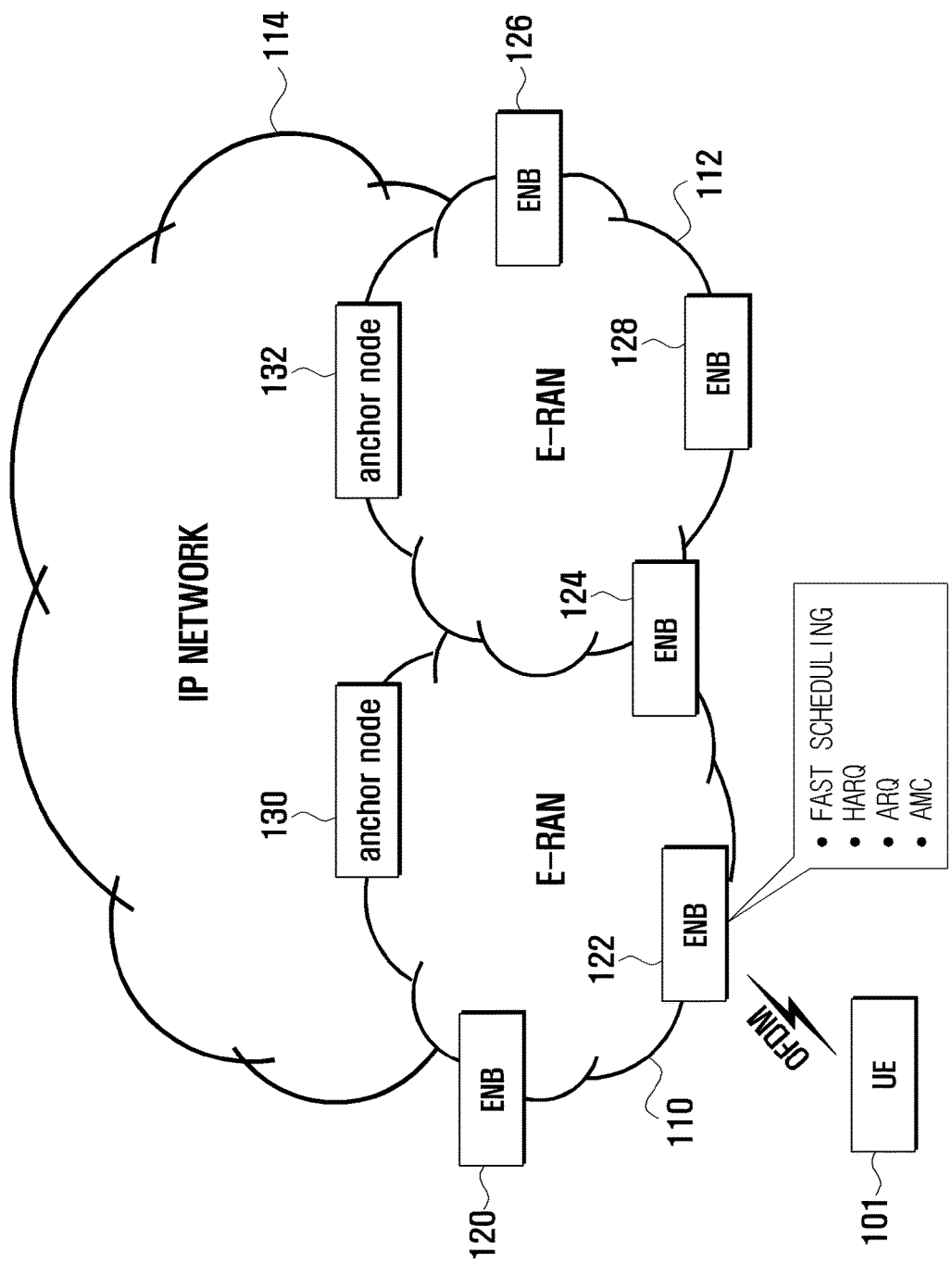
FIG. 1 illustrates a diagram for an LTE system to which the radio link failure detection method of the present invention is adopted.
Figure 2:
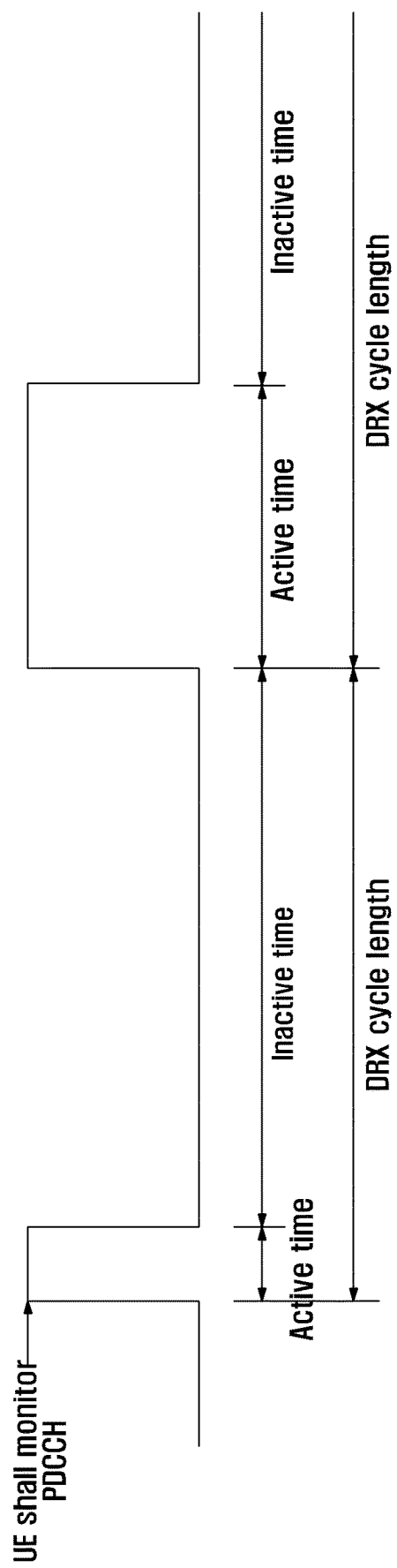
FIG. 2 illustrates a timing diagram for a Discontinuous Reception (DRX) mode operation of a UE in the LTE system of FIG. 1.

FIGS. 3 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system. In the following description, the terms "DRX operation mode" and "DRX mode" are synonymously used, and the terms "non-DRX mode" and "continuous mode" are synonymously used.

In the following description, an RLF detection period is divided into a first period of M DRX cycles starting at a transition from the non-DRX mode to the DRX mode, a second period equal to the duration operating in DRX mode, and a third period transitioning from the DRX mode to the non-DRX mode.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In an exemplary embodiment of the present invention, the RLF detection method is proposed with the following operations of the UE in DRX mode.

1. M DRX cycles after transition from non-DRX mode to DRX mode (the first period):

In the first period, the UE monitors and averages the radio channel status according to the following options 1 and 2 and reports the synchronization status, i.e., an in-sync or an out-of-sync, to the higher layers according to the result value (here, the in-sync means a connected condition of the radio and the out-of-sync means a disconnection condition between the UE and eNB).

Option 1: N1+n*DRX cycle length

Option 2: (n+k)*DRX cycle length where, N1 denotes a duration for monitoring and averaging the radio channel condition to detect the RLF in non-DRX mode (e.g., 200 ms (or first duration, identical hereinafter)), n denotes $n^{th}$ DRX cycle after transition from the non-DRX mode to the DRX mode, and k is 0 or positive integer. Also, M cycles denote the elapse of time to the extent enough to determine the complete transition from the non-DRX mode to the DRX mode.

2. RLF detection method within a DRX cycle length (the second period) (applied after the transition from the no-DRX mode to the DRX mode regardless of before and after the M DRX cycles):

In the second period, the RLF detection method can be applied as followings depending on the difference between the active time length and N1 within the DRX cycle.

If N1 is greater than or equal to the active time in the DRX cycle (active time in the DRX cycle length ≤N1), the UE monitors and averages the radio channel condition during N2 and reports the in-sync/out-of-sync to the higher layers depending on the result value.

Otherwise, if the active time length in the DRX cycle is greater than or equal to N1 (active time in the DRX cycle length ≥N1), the UE monitors and averages the radio channel condition during N1 and reports the in-sync/out-of-sync to the higher layers depending on the result value.

Where N1 denotes a duration for monitoring and averaging the radio channel condition to detect the RLF in non-DRX mode (e.g., 200 ms (in the present invention, setting the N1 value regardless of the above definition is not ruled out)), and N2 denotes the duration for monitoring and averaging the radio link to detect the RLF in DRX mode. N2 before the M DRX cycles after the transition from the non-DRX mode to the DRX mode can be defined as following:

N2=N1+n*DRX cycle length (option 1) (or the second time, identical hereinafter) or (n+k)*DRX cycle length (option 2)

N2 after M DRX cycles following the transition from the non-DRX mode to the DRX mode can be defined as following:

N2=M*DRX cycle length (or the third time, identical hereinafter)

3. After transition from the DRX mode to the non-DRX mode (the third period)

The UE monitors and averages the radio channel condition during the N2 duration before the time N1 after the transition to the non-DRX mode, and reports the in-sync/out-of-sync to the higher layer depending on the result value.

Also, the UE monitors and averages the radio channel condition during the N1 duration after the time N1 following the transition to the non-DRX mode and reports the in-sync/out-of sync to the higher layer depending on the result value.

Here N1 is a duration for monitoring and averaging the radio channel condition to detect the RLF in the non-DRX mode (e.g., 200 ms (in the present invention, setting the N1 value regardless of the above definition is not ruled out)), and N2 denotes the duration for monitoring and averaging the radio link to detect the RLF in DRX mode and can be defined as following in detail. First, the N2 before the M DRX cycle length after the transition from the non-DRX mode to the DRX mode can be defined as following:

N2=N1+n*DRX cycle length (option 1) or 9n+k)*DRX cycle length (option 2)

The N2 after the M DRX cycles following the transition from the non-DRX mode to the DRX mode can be defined as following:

N2=M*DRX cycle length

How the UE detects the RLF in the respective first to third periods has been described schematically herein above. The RLF detection method according to an exemplary embodiment is described in more detail with reference to accompanying drawings.

Figure 3A:
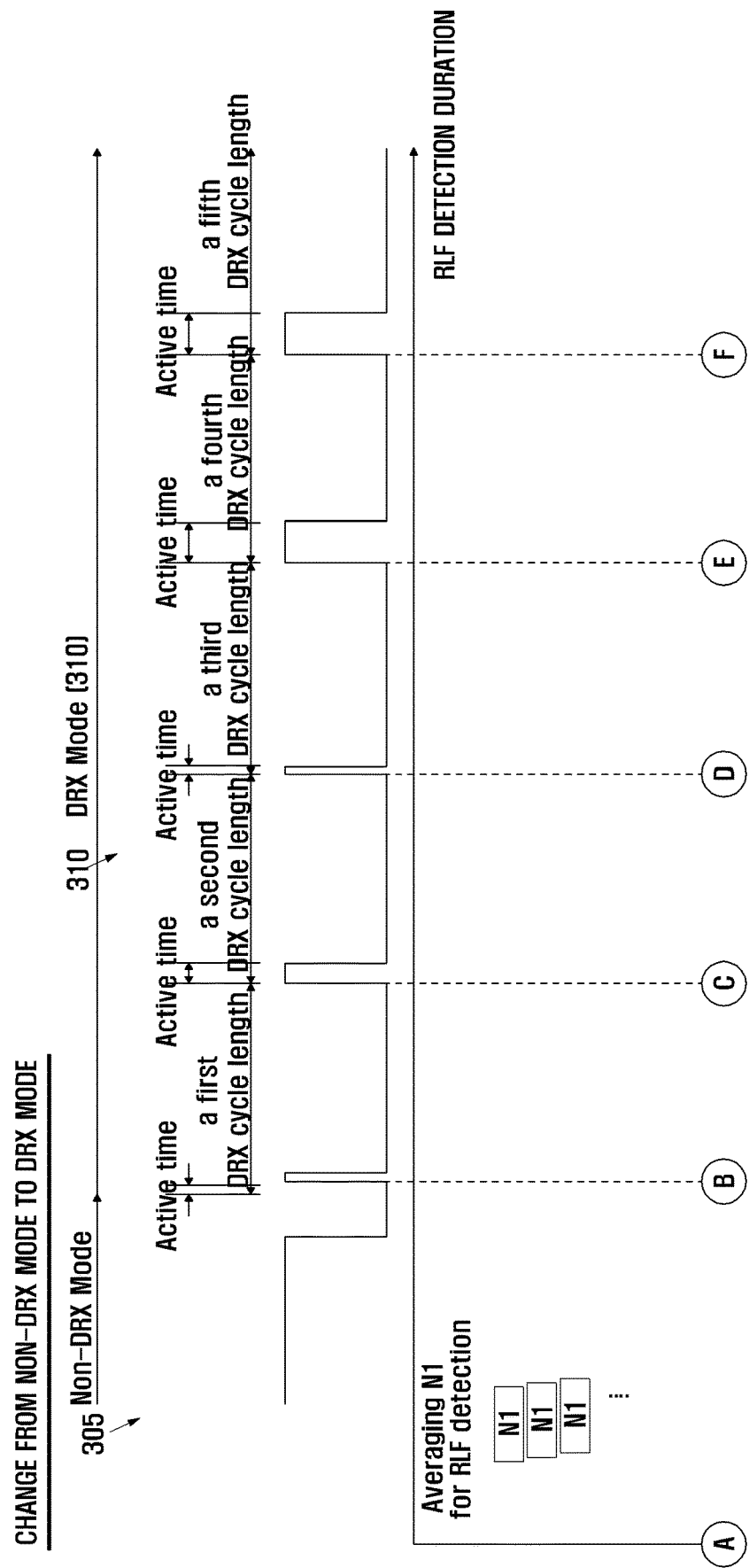

FIGS. 3A-3B illustrate a timing diagram for an RLF detection method after the transition from the non-DRX mode to the DRX mode, i.e., in the first period, according to an exemplary embodiment of the present invention.

In the duration of non-DRX mode, the UE monitors and averages the radio channel condition for N1 and reports the in-sync/out-of-sync to the higher layers depending on the averaging result value. As shown in FIGS. 3A-3B, N1 acts as a moving window so as to progress along the (sub)frame. N1 can be defined as follow:

N1: duration for monitoring and averaging the radio channel condition to detect RLF in non-DRX mode (e.g., 200 ms)

The UE can regard the duration of the M DRX cycles after the transition from the non-DRX mode to the DRX mode that the transition to the DRX mode in progress. In this case, the UE monitors and averages the radio channel condition for the RLF detection duration according to the following options 1 and 2 and reports the result value to the higher layers.

Option 1: N1+n*DRX cycle length
Option 1: (n+k)*DRX cycle length where N1 is the duration for monitoring and averaging the radio channel condition to detect RLF in non-DRX mode (e.g., 200 ms), n is nth DRX cycle after the transition from the non-DRX mode to the DRX mode, and k is '0' or positive integer.

In the meantime, the UE can regard the time when the M DRX cycles following the transition from the non-DRX mode to the DRX mode ends that the transmission to the DRX mode is complete. In this case, the UE monitors and averages the radio channel condition for M*DRX cycle length and reports the in-sync/out-of-sync to the higher layers depending on the result value (M=0 or positive integer).

As shown in FIGS. 3A-3B, the radio channel condition monitoring and averaging duration defined in the active time of DRX cycle, i.e., the RLF detection period, progresses along the (sub)frame as a moving window. In FIGS. 3A-3B, the active time within the DRX cycle is shorter than N1. When the active times within all the DRX cycles are longer than N1, different operations are defined as described with reference to FIG. 4.

According to the above described rules, the radio channel condition monitoring and averaging duration in each DRX cycle of the UE is as follows:

In the example illustrated in FIGS. 3A-3B, M is set to 5 for M DRX cycles. That is, the UE completes the transition from the non-DRX mode to the DRX mode in 5 DRX cycles and regards the end of the 5 DRX cycles as the start of the DRX mode.

First, the RLF detection period in the first DRX cycle 320 after the start of the transmission to the DRX mode can be defined as N1+1*DRX cycle length or (1+k)*DRX cycle length 325.

Also, the RLF detection period in the second DRX cycle 330 after the start of the transition to the DRX mode can be defined as N1+2*DRX cycle length or (2+k)*DRX cycle length 335.

Also, the RLF detection period in the third DRX cycle 340 after the start of the transition to the DRX mode can be defined as N1+3*DRX cycle length or (3+k)*DRX cycle length 345.

Also, the RLF detection period in the fourth DRX cycle 350 after the start of the transition to the DRX mode can be defined as N1+4*DRX cycle length or (4+k)*DRX cycle length 355.

Finally, the RLF detection period in the fifth DRX cycle 360 after the start of the transition to the DRX mode can be defined as N1+5*DRX cycle length or (5+k)*DRX cycle length 365.

To help deeper understanding, the RLF detection period 325 in the first DRX cycle duration 320 and the RLF detection period 335 in the second DRX cycle duration 330 are compared. Here, the RLF detection period 335 is longer than the previous RLF detection period 325 by as much as 1*DRX cycle length, and this is to obtain more samples as compared to the active time in the non-DRX mode.

For the same reason, the RLF detection period 345 is longer than the previous RLF detection period 335 as much as 1*DRX cycle length as much as 1*DRX cycle length, and the RLF detection period 355 is longer than the previous RLF detection period 345 as much as I*DRX cycle length.

The measurement sampling times for the radio channel condition in the RLF detection period can be adjusted in consideration of fairness between the no-DRX mode and the DRX mode, or the sampling times in the non-DRX mode can be adjusted in consideration of the sampling times in the DRX mode. That is, the sampling times in the non-DRX mode can be defined as 'a*sampling times in DRX mode' (a is a decimal greater than '0' and positive integer).

FIG. 4 illustrates a timing diagram for an RLF detection method in a DRX cycle length, i.e., in the active time of the second period, according to an exemplary embodiment of the present invention.

In case that the active time of the DRX cycle length ≤N1, the UE monitors and averages the radio channel condition for a duration N2 430 and reports the in-sync/out-of-sync to the higher layers depending on the result value. In case that the active time of the DRX cycle length ≥N1, the UE monitors and averages the radio channel condition for the duration N1 420 and reports the in-sync/out-of-sync to the higher layers depending on the result value. As shown in FIG. 4, the durations N1 and N2 are acting as moving windows so as to progress along the (sub)frame. Here, the duration N1 is a period (e.g., 200 ms (in an exemplary embodiment of the present invention, setting the value of N1 regardless of the above definition is not ruled out)) for monitoring and averaging the radio channel condition to detect the RLF in non-DRX mode, and the duration N2 is a period for monitoring and averaging the radio channel condition to detect the RLF in the DRX mode. The duration N2 can be defined as follows. First, during the M DRX cycles following the transition from the non-DRX mode to the DRX mode, the N2 is defined as following:

N2=N1+n*DRX cycle length (option 1) or (n+k)*DRX cycle length (option 2)

Also, after the M DRX cycles following the transition from the non-DRX mode to the DRX mode, the N2 is defined as following:

N2=M*DRX cycle length

In FIG. 4, except for the last DRX cycle, the active time is shorter than N1 420 in all the DRX cycles. In this case, the UE monitors and averages the radio channel condition in the duration N2 430, for the active times of these DRX cycles, and reports the in-sync/out-of-sync to the higher layers depending on the result value.

Meanwhile, in cases of the active time 412 of the last DRX cycle 410, which is longer than N1 420, the UE monitors and averages the radio channel condition in the duration N1 420 for the active time of the DRX cycle and reports the in-sync/out-of-sync to the higher layers depending on the result value.

FIG. 5 illustrates a timing diagram for an RLF detection method after the transition from the DRX mode to the non-DRX mode, i.e., the third period, according to an exemplary embodiment of the present invention.

After the transition to the non-DRX mode 520, the UE monitors and averages the radio channel condition in the duration N2 before the start of the duration N1 and reports the in-sync/out-of-sync to the higher layers depending on the result value.

If the duration N1 is elapsed after the transition to the non-DRX mode 530, the UE monitors and averages the radio channel condition in the duration N1 and reports the in-sync/out-of-sync to the higher layers depending on the result value.

As shown in FIG. 5, the durations N2 and N1 act as moving windows so as to progress along the (sub)frame. Here, the duration N1 is a period (e.g., 200 ms (in an exemplary embodiment of the present invention, setting the value of N regardless of the above definition is not ruled out)) for monitoring and averaging to the radio channel condition to detect the RLF in non-DRX mode, and the duration N2 is a period for monitoring and averaging the radio channel condition to detect the RLF in DRX mode. The duration N2 can be defined as follows. First, during the M DRX cycles following the transition from the non-DRX mode to the DRX mode, the N2 is defined as following:

N2=N1+n*DRX cycle length (option 1) or (n+k)*DRX cycle length (option 2)

Also, after the M DRX cycles following the transition from the non-DRX mode to the DRX mode, the N2 is defined as following:

N2=M*DRX cycle length

Figure 6:
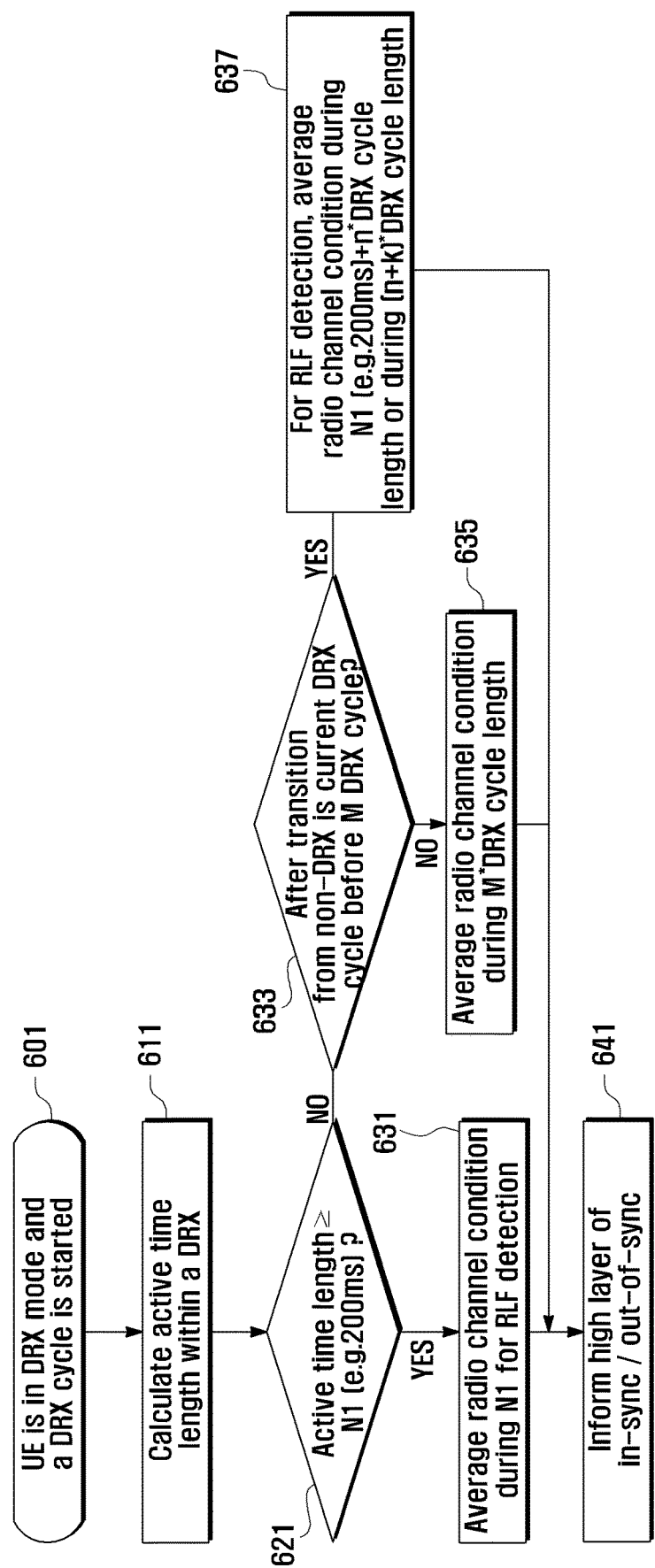
FIG. 6 illustrates a flowchart for an RLF detection method according to an exemplary embodiment of the present invention.

FIG. 6 illustrates a flowchart for an RLF detection method according to an exemplary embodiment of the present invention. FIG. 6 is depicted under the assumption of the situation where the UE transitions from the non-DRX mode to the DRX mode.

Referring to FIG. 6, the UE is in the DRX mode with the start of the DRX cycle (block 601). With the start of the DRX cycle, the UE calculates the active time length within the DRX cycle (block 611) and compares the active time and the duration N1 (e.g., 200 ms) to determines whether the active time is greater than or equal to N1 (block 621). If the active time is equal to or longer than N1, the UE monitors and averages the radio channel condition during N1 to detect RLF (block 631) and informs the higher layers of the in-sync/out-of-sync depending on the result value (block 641).

Otherwise, if the active time is not equal to or longer than N1, the UE determines whether the current DRX cycle is the $M^{th}$ or later DRX cycle after the transition from the non-DRX mode to the DRX mode (block 633). If the current DRX cycle is the $M^{th}$ or later DRX cycle after the transition from the non-DRX mode to the DRX mode, the UE monitors and averages the radio channel condition during the $M^{th}$ or later DRX cycle (block 635) and informs the higher layers of the in-sync/out-of-sync depending on the result value (block 641).

Otherwise, if the current DRX cycle is not the $M^{h}$ or later DRX cycle, the UE monitors and averages the radio channel condition during the duration 'N1+n*DRX Cycle length' (option 1) or '(n+k)*DRX cycle length (option 1) (block 637) and informs the higher layers of the in-sync/out-of-sync depending on the result value (block 641).

In FIG. 6, the operations following step 611 can repeat every (sub)frame during the active time in the DRX cycle. At this time, the durations of N1 and 'N1+n*DRX cycle length/(n+k)*DRX cycle length, M*DRX cycle length' act as moving windows so as to progress along the (sub)frame. Detailed descriptions about the variables related to these durations are described already with reference to the drawings, thereby being omitted herein.

Figure 7:
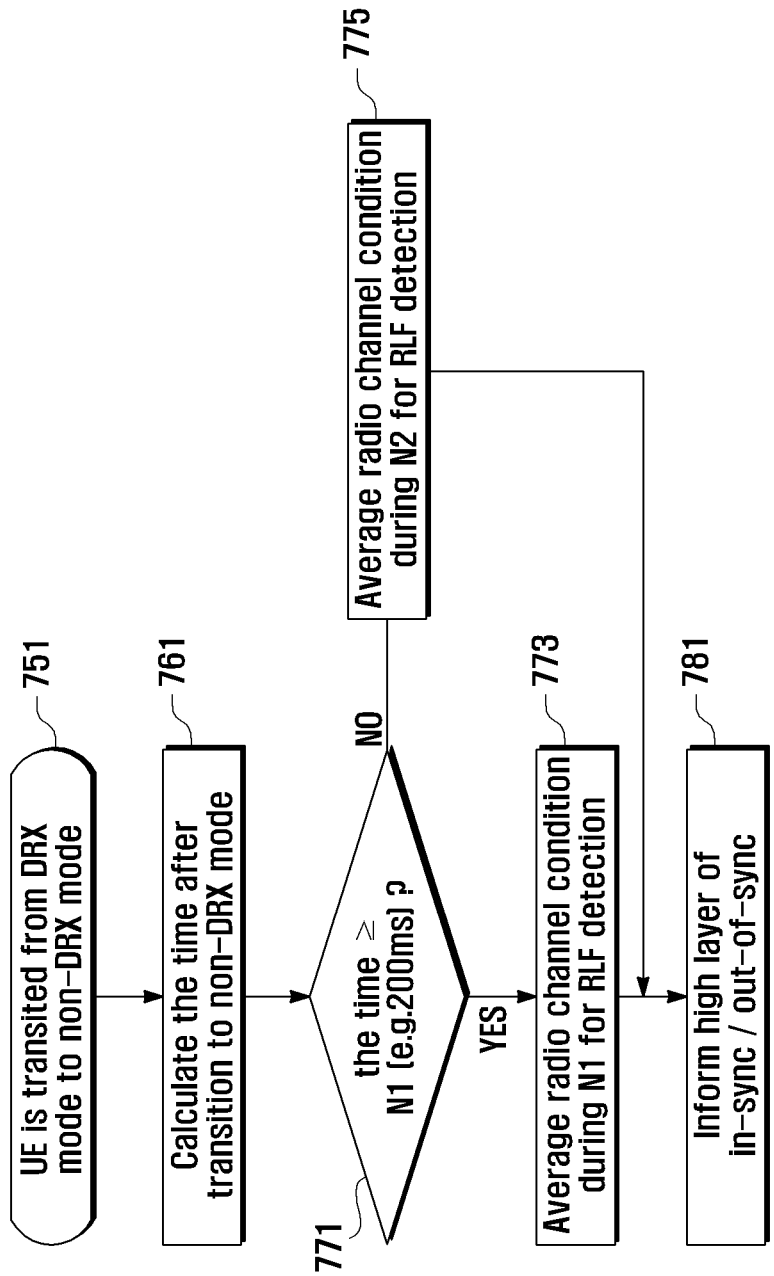
FIG. 7 illustrates a flowchart for an RLF detection method according to another exemplary embodiment of the present invention.

FIG. 7 illustrates a flowchart for an RLF detection method according to another exemplary embodiment of the present invention. FIG. 7 is depicted under the assumption of the situation where the UE transitions from the DRX mode to the non-DRX mode.

Referring to FIG. 7, the UE transitions from the DRX mode to the non-DRX mode (block 751). After the transition to the non-DRX mode, the UE calculates the time elapsed after the transition to the non-DRX mode (block 761) and determines whether the calculated time is greater than or equal to the duration N1 (e.g. 200 ms) (block 771). If the calculated time is greater than or equal to the duration N1, the UE monitors and averages the radio channel condition during N1 for RLF detection (block 773) and informs the higher layers of the in-sync/out-of-sync depending on the result value (block 781).

Otherwise, if the calculated time is not equal to or greater than the duration N1, the UE monitors and averages the radio channel condition during N2 for RLF detection (block 775) and informs the higher layers of the in-sync/out-of-sync depending on the result value (block 781).

In FIG. 7, the operations following step 761 can repeat every (sub)frame after the transition to the non-DRX mode. At this time, the duration N1 and N2 act as moving windows so as to progress along the (sub)frame. Detailed descriptions about the variables related to these durations are described already with reference to the drawings, thereby being omitted herein.

Figure 8:
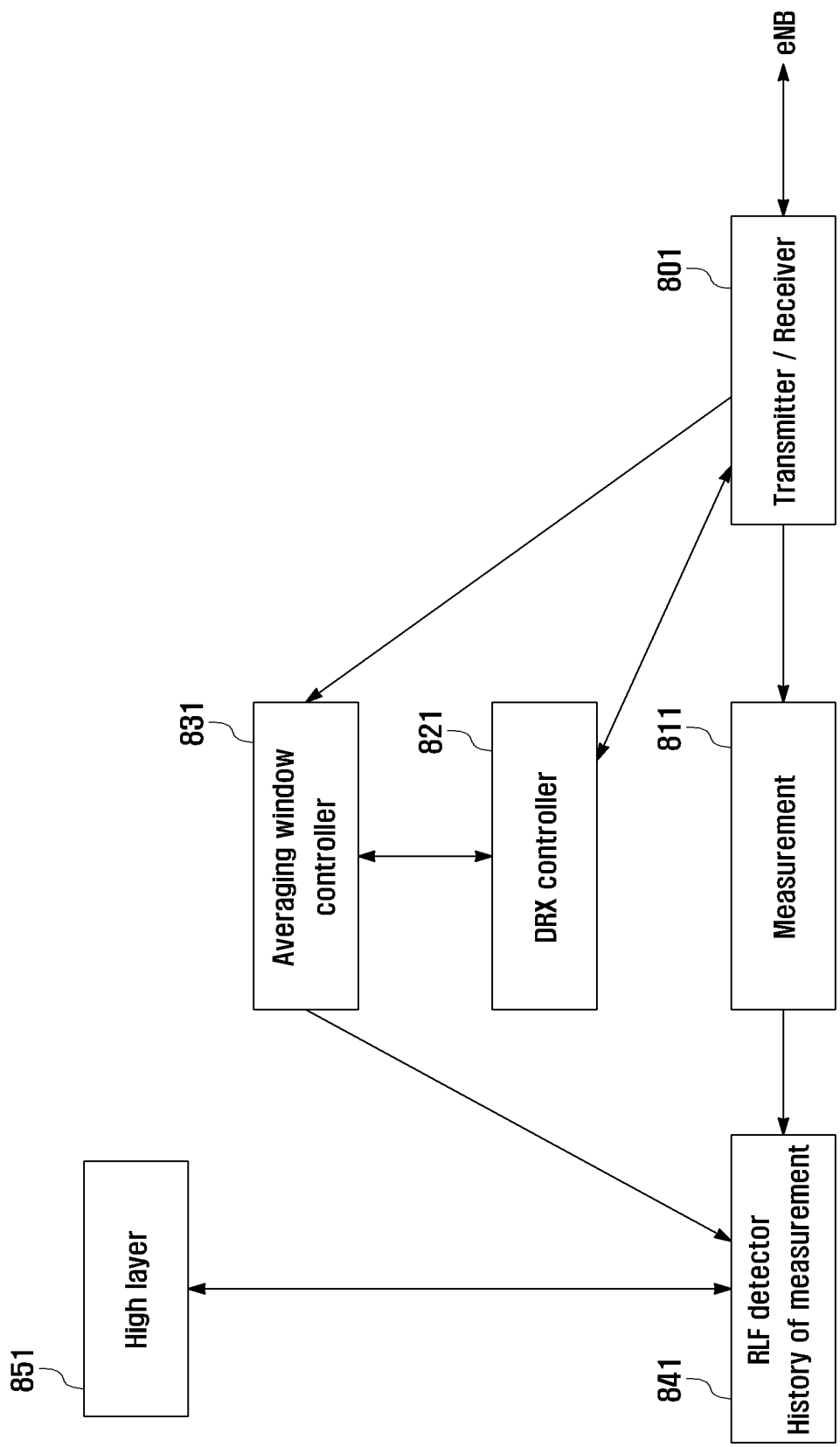
FIG. 8 illustrates a block diagram for a UE configured to support the rlf detection method according to an exemplary embodiment of the present invention.

FIG. 8 illustrates a block diagram for a UE configured to support the RLF detection method according to an exemplary embodiment of the present invention.

As shown in FIG. 8, the UE includes a transceiver 801, a channel measurer 811, a DRX controller 821, an averaging window controller 831, a RLF detector 841, and a higher layer 851.

The transceiver 801 is configured to transmit and receive radio signals.

The channel measurer 811 is configured to measure radio channel condition.

The DRX controller 821 controls the transition of the UE's operation mode between the non-DRX mode and the DRX mode and timers for managing the DRX cycle length and active time within the DRX cycle.

The averaging window controller 831 controls the durations for monitoring and averaging the radio channel condition and determines the durations for monitoring and averaging the radio channel condition using the information on the transition between the non-DRX mode and the DRX mode that is provided by the DRX controller 821 and the active time information received by means of the transceiver 801. That is, the averaging window controller 831 adjusts the length of the monitoring duration for RLF detection according to the transitioned operation mode and controls the movement of the detection window to detect the radio link failure. The RLF detector 841 monitors and averages the radio channel condition within the detection window determined by the averaging window controller 831 and information the higher layer 851 of the in-sync/out-of-sync depending on the result value.

As described above, the radio link failure detection method of the present invention allows adjusting the radio link monitoring period in the non-DRX mode and the DRX mode, thereby efficiently detecting the radio link failure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for monitoring a radio link by a terminal in a wireless communication system, the method comprising:
   estimating a radio link condition based on channel conditions measured during a first evaluation period in a first reception mode;
   for a duration of time after transitioning from the first reception mode to a second reception mode, estimating a radio link condition based on channel conditions measured during an evaluation period, the evaluation period used during the duration of time in the second reception mode; and
   estimating a radio link condition based on channel conditions measured during a second evaluation period in the second reception mode, after the duration of time,
   wherein the evaluation period is not less than a minimum of the first evaluation period and the second evaluation period,
   wherein the evaluation period is not less than the first evaluation period based on the first evaluation period being shorter than the second evaluation period.

2. The method of claim 1, wherein the first reception mode is one of a Discontinuous Reception (DRX) mode and a non-DRX mode and the reception second mode is another of the DRX mode and the non-DRX mode.

3. The method of claim 1, wherein the duration of time is equal to the second evaluation period.

4. The method of claim 1, wherein the evaluation period is not less than the second evaluation period based on the second evaluation period being shorter than the first evaluation period.

5. The method of claim 1, wherein, if the first reception mode is a non-DRX mode, a length of the first evaluation period is a preset value.

6. The method of claim 1, wherein a length of the first evaluation period is 200 milliseconds (ms).

7. The method of claim 1, wherein a length of the first evaluation period or the second evaluation period is defined as M cycles times a DRX cycle length, wherein M is an integer.

8. The method of claim 7, wherein the M cycles denote an elapse of time sufficient to determine a complete transition from the first reception mode to the second reception mode.

9. The method of claim 1, wherein the evaluation period is an arbitrary value plus a minimum among the first evaluation period and the second evaluation period.

10. A terminal for monitoring a radio link in a wireless communication system, the terminal comprising:
    a transceiver configured to transmit and receive a signal; and
    at least one processor configured:
       to estimate a radio link condition based on channel conditions measured during a first evaluation period in a first reception mode,
       for a duration of time after transitioning from the first reception mode to a second reception mode, to estimate a radio link condition based on channel conditions measured during an evaluation period, the evaluation period used during the duration of time in the second reception mode, and
       to estimate a radio link condition based on channel conditions measured during a second evaluation period in the second reception mode, after the duration of time,
    wherein the evaluation period is not less than a minimum of the first evaluation period and the second evaluation period,
    wherein the evaluation period is not less than the first evaluation period based on the first evaluation period being shorter than the second evaluation period.

11. The terminal of claim 10, wherein the first reception mode is one of a Discontinuous Reception (DRX) mode and a non-DRX mode and the second reception mode is another of the DRX mode and the non-DRX mode.

12. The terminal of claim 10, wherein the duration of time is equal to the second evaluation period.

13. The terminal of claim 10, wherein the evaluation period is not less than the second evaluation period based on the second evaluation period being shorter than the first evaluation period.

14. The terminal of claim 10, wherein, if the first reception mode is a non-DRX mode, a length of the first evaluation period is a preset value.

15. The terminal of claim 10, wherein a length of the first evaluation period is 200 milliseconds (ms).

16. The terminal of claim 10, wherein a length of the first evaluation period or the second evaluation period is defined as M cycles times a DRX cycle length, wherein M is an integer.

17. The terminal of claim 16, wherein the M cycles denote an elapse of time sufficient to determine a complete transition from the first reception mode to the second reception mode.

18. The terminal of claim 10, wherein the evaluation period is an arbitrary value plus a minimum among the first evaluation period and the second evaluation period.

* * * * *